(12) United States Patent
Lynch et al.

(10) Patent No.: US 6,569,011 B1
(45) Date of Patent: May 27, 2003

(54) SYSTEM AND METHOD FOR PLAYER TRACKING

(75) Inventors: Randall G. Lynch, Lewisville, TX (US); Christie L. Lynch, Lewisville, TX (US)

(73) Assignee: Battlepaint, Inc., Lewisville, TX (US)

( * ) Notice: Subject to any disclaimer, the term of this patent is extended or adjusted under 35 U.S.C. 154(b) by 0 days.

(21) Appl. No.: 09/907,380

(22) Filed: Jul. 17, 2001

Related U.S. Application Data

(60) Provisional application No. 60/218,998, filed on Jul. 17, 2000.

(51) Int. Cl.$^7$ .............................. A63F 13/00; A63F 9/24; G06F 17/00; G06F 19/00
(52) U.S. Cl. ................................. 463/1; 434/16; 434/22
(58) Field of Search .................... 463/1, 50–52; 434/16, 22; 273/311, 313, 371

(56) References Cited

U.S. PATENT DOCUMENTS

| | | | |
|---|---|---|---|
| 4,695,058 A | 9/1987 | Carter, III et al. | 273/311 |
| 4,744,761 A | 5/1988 | Doerfel et al. | 434/16 |
| 4,976,619 A | 12/1990 | Carlson | 434/16 |
| 5,074,793 A | 12/1991 | Hambric et al. | 434/11 |
| 5,292,254 A | 3/1994 | Miller et al. | 434/11 |
| 5,320,362 A | 6/1994 | Bear et al. | 273/440 |
| 5,393,074 A | 2/1995 | Bear et al. | 273/440 |
| 5,474,452 A | 12/1995 | Campagnuolo | 434/11 |
| 5,571,018 A | 11/1996 | FitzGerald | 434/16 |
| 5,695,341 A | 12/1997 | FitzGerald et al. | 434/16 |
| 5,993,215 A * | 11/1999 | Kotsipoulos et al. | 434/21 |
| 6,139,323 A * | 10/2000 | Christians et al. | 434/16 |
| 6,283,756 B1 * | 9/2001 | Danckwerth et al. | 434/11 |

OTHER PUBLICATIONS

Jay Carr, "Big Splash in Child Monitoring", Dallas Morning News, Thursday, Jul. 13, 2000, 2F.
Lotek Engineering, Inc., Telemetry System Design Overview, from website http://www.lotek.com, undated.
Lotek, "Fish & Wildlife Monitoring Systems, SRX 400 Receiver Systems," marketing brochure, undated.
Lotek Engineering, Inc., "Radio Tracking Collars for Small Mammals," marketing brochure, undated.
Lotek Engineering, Inc., "Radio Tracking Collars for Large Mammals," marketing brochure, undated.
Lotek Engineering, Inc., "Remote Release Mechanism for GPS and VHF Collars," marketing brochure, undated.
Lotek Engineering, Inc., "The Power of GPS in Wildlife Research," marketing brochure, undated.
Lotek Engineering, Inc., "Suretrack STR_1000 Programmable Scanning Receivers," marketing brochure, undated.
Lotek Engineering, Inc., "SRX_400 Receiver Configurations," marketing brochure, undated.
Challenge Park Xtreme, "Go to the Xtreme," from website http://www.challengepark/xtreme, undated.

* cited by examiner

*Primary Examiner*—Melvin Jones
(74) *Attorney, Agent, or Firm*—Christopher J. Rourk; Akin Gump Strauss Hauer & Feld, LLP

(57) ABSTRACT

A system for tracking players is provided. The system includes one or more player systems, such as a device worn on the arm of each player in a paintball arena. Each player system generates coordinate data and control data, such as data showing the identity of the player, the status of the player, or other suitable control data. A tracking controller receiving the coordinate data and control data, such as by transmitting the coordinate data and the control data over a wireless media from each player system to the tracking controller. The tracking controller performs one or more functions based on the control data, such as mapping the location of one or more players, showing the status of one or more players, and keeping score.

20 Claims, 6 Drawing Sheets

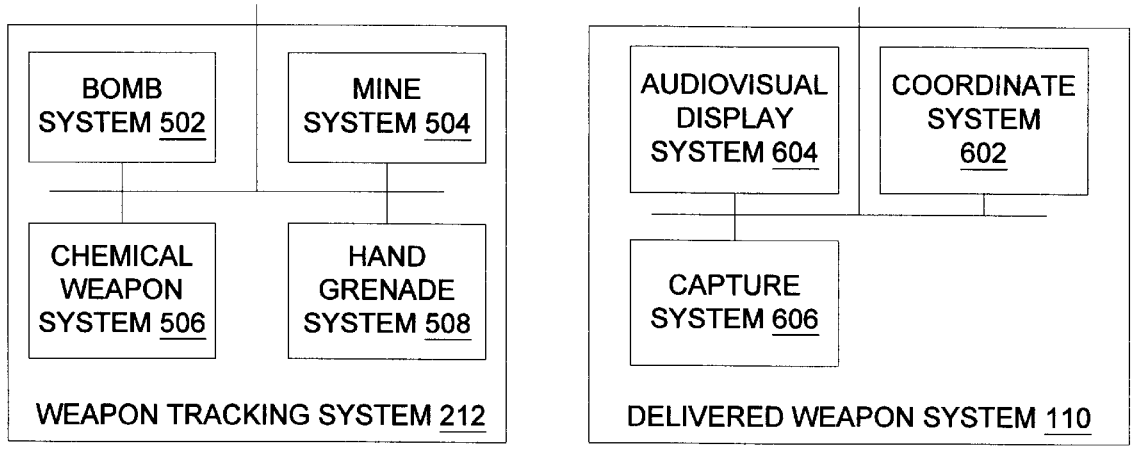
FIGURE 5
FIGURE 6
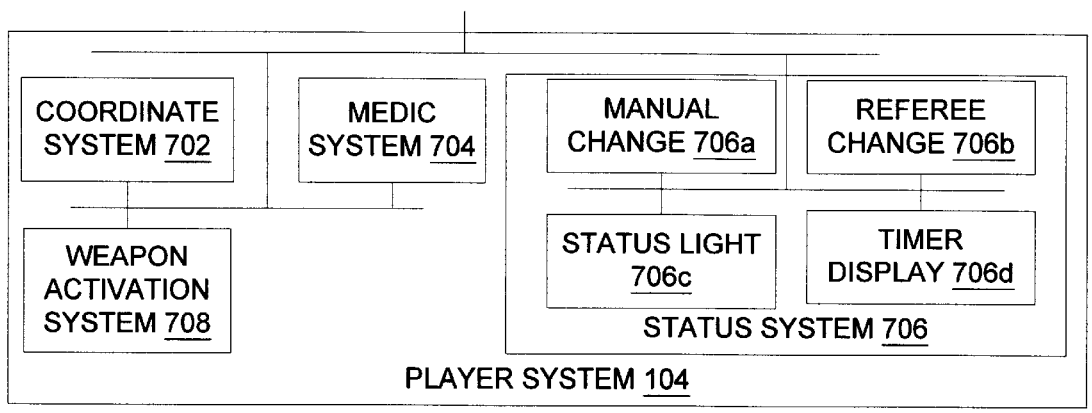
FIGURE 7
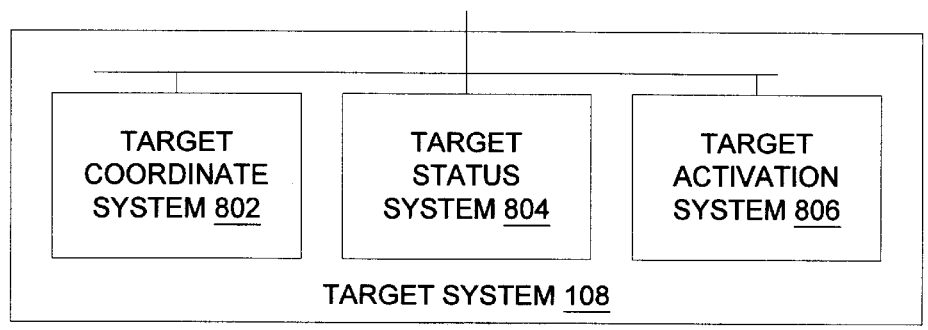
FIGURE 8

US 6,569,011 B1

SYSTEM AND METHOD FOR PLAYER TRACKING

CROSS-REFERENCE TO RELATED APPLICATIONS

This application is related to U.S. patent application Ser. No. 09/907,404 entitled "Virtual Battlefield Simulator System and Method" filed on Jul. 17, 2001, which is currently pending and commonly owned with the present application.

RELATED APPLICATIONS

The present application is related to and claims priority to U.S. Provisional application No. 60/218,998, "Virtual Battlefield Simulator System and Method," filed Jul. 17, 2000, Randal G. Lynch and Christie L. Lynch, inventors.

FIELD OF THE INVENTION

The present invention pertains to the field of player tracking systems. More specifically, the invention relates to a system and method for tracking players that allows player location data to be used to provide game functionality.

BACKGROUND OF THE INVENTION

Player tracking systems are known in the art. These player tracking systems allow the location of players in certain sports, such as hockey, to be tracked. Although such player tracking systems have been used to acquire, process and display location data of players, such as for the benefit of observers or officials, games generally do not utilize the player tracking system functionality to enhance or modify the game. Because games have developed without the use of player tracking systems, the addition of a player tracking system to a game typically requires modification of the rules to accommodate the player tracking system.

SUMMARY OF THE INVENTION

In accordance with the present invention, a system and method for tracking players are presented that overcome known problems with tracking players and that provide game functionality using player tracking data.

In particular, a system and method for tracking players are provided that allow game functionality to be provided using the player coordinate data so as to allow players to interact using the player coordinate data.

In accordance with an exemplary embodiment of the present invention, a system for tracking players is provided. The system includes one or more player systems, such as a device worn on the arm of each player in a paintball arena. Each player system generates coordinate data and control data, such as data showing the identity of the player, the status of the player, or other suitable control data. A tracking controller receiving the coordinate data and control data, such as by transmitting the coordinate data and the control data over a wireless media from each player system to the tracking controller. The tracking controller performs one or more functions based on the control data, such as mapping the location of one or more players, showing the status of one or more players, and keeping score.

The present invention provides many important technical advantages. One important technical advantage of the present invention is a system and method for tracking players that allows player location and status to be monitored. The present invention thus allows virtual weaponry to be used in games, allow referees to more effectively oversee game operations, and provides other useful functionality. The present invention also allows weapons to be simulated and tracked for use in a suitable game environment, such as a paintball arena. The invention thus allows game functions to.be expanded to include the use of simulated weapons, so as to better simulate actual wartime activities, provide additional features for games, or otherwise be implemented in conjunction with games. Elements of the invention can also be used where player coordinate tracking is not performed.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIG. 5 is a diagram of a system for providing weapons tracking functionality in accordance with an exemplary embodiment of the present invention;

FIG. 6 is a diagram of a system for modeling weapon delivery in accordance with an exemplary embodiment of the present invention;

FIG. 7 is a diagram of a system for allowing a player to utilize a player tracking system in a game in accordance with an exemplary embodiment of the present invention;

FIG. 8 is a diagram of a system for providing target functionality in accordance with an exemplary embodiment of the present invention;

DETAILED DESCRIPTION OF THE INVENTION

Figure 1:
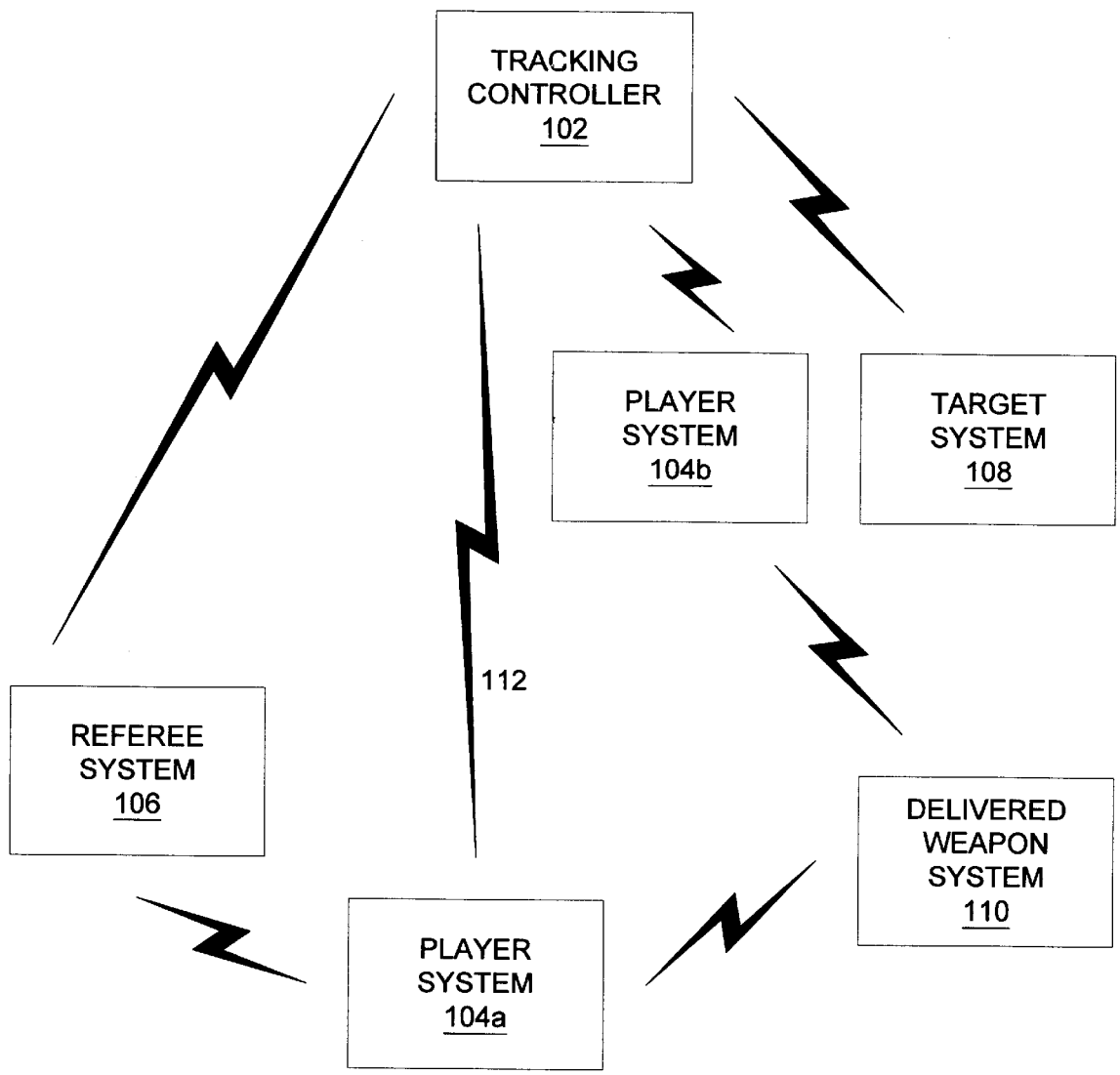
FIG. 1 is a diagram of a system for player racking in accordance with an exemplary embodiment of the resent invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for player tracking in accordance with an exemplary embodiment of the present invention. System 100 allows player tracking to be incorporated into a game, such as paintball, so as to allow additional functions that are made possible by tracking to be incorporated into the game. Likewise, some of the features of system 100 can also or alternately be used where the tracking of participants is not performed.

System 100 includes tracking controller 102, which can be implemented in hardware, software, or a suitable combination of hardware and software, and which can be one or more software systems operating on a general purpose server platform, such as one or more DELL Poweredge 2550 servers, each having dual Pentium III processors, 512 MB SDRAM, and 100 GB of hard drive storage. As used herein, a software system can include one or more objects, agents, threads, subroutines, separate software applications, two or more lines of code or other suitable software structures operating in two or more separate software applications, on two or more different processors, or other suitable software architectures. In one exemplary embodiment, a software system can include one or more lines of code or other suitable software structures operating in a general purpose software application, such as an operating system, and one or more lines of code or other suitable software structures operating in a specific purpose software application. In another exemplary embodiment, a software system can be one or more lines of hypertext markup language (HTML), extensible markup language (XML), a web browser plug-in, or other suitable code that operates in conjunction with a web browser application.

Tracking controller 102 interfaces with player systems 104a and 104b, target system 108, referee system 106, and delivered weapon system 110 via wireless communications medium 112 or other suitable communications media. As used herein, the term "couple," and its cognate terms such as "couples" and "coupled," can include a physical connection (such as through one or more copper conductors), a virtual connection (such as one or more randomly assigned data memory locations of a data memory device), a logical connection (such as through one or more logical devices of a semiconducting circuit), a wireless connection, a hypertext transfer protocol (HTTP) connection, other suitable connections, or a suitable combination of such connections. In one exemplary embodiment, systems and components can be coupled to other systems and components through intervening systems and components, such as through an operating system of a general purpose server platform. Communications medium 112 can include a cellular wireless media and intervening wireline media, a local radio frequency wireless connection, a wireless network, other suitable media, or a suitable combination of such connections. In one exemplary embodiment, communications medium 112 can be an infrared communications media, a magnetic communications media, a physical connection, or other suitable connections that are used by to facilitate communications with tracking controller 102 at a staging area, such as before and after a game, for embodiments of the present invention that do not require player coordinate data to be continuously monitored.

Player systems 104a and 104b can be implemented in hardware, software, or a suitable combination of hardware and software, and can be one or more software systems operating on a battery powered, portable processing platform, such as a C/C++ programmable 16-bit microprocessor with associated systems (such as an infrared receiver, LCD display, LED display, speaker, memory, controller interface, wireless transceiver, and other suitable systems), or other suitable platforms. Player systems 104a and 104b can further include physical or software interface systems for connecting to other player systems 104, target systems 108, delivered weapon systems 110, or other suitable systems. Player systems 104b and 104a communicate with tracking controller 102 to receive control and status data from tracking controller 102, to communicate data regarding the location of player systems 104a and 104b, and for other suitable purposes. Player systems 104a and 104b can include a global positioning system (GPS) functionality or other suitable functionality that generates coordinate data for each player, such that tracking controller 102 can determine the approximate coordinates of each player system 104a and 104b.

Referee system 106 can be implemented in hardware, software, or a suitable combination of hardware and software, and can be one or more software systems operating on a portable processing platform such as a on a battery powered, portable processing platform, such as a C/C++ programmable 16-bit microprocessor with associated systems (such as an infrared receiver, LCD display, LED display, speaker, memory, controller interface, wireless transceiver, and other suitable systems), or other suitable platforms. Referee system 106 can receive player status information from tracking controller 102, such as by transmitting player identification data to tracking controller 102 and receiving update status data from tracking controller 102 for that player. In one exemplary embodiment, referee system 106 can include an infrared controller or other suitable controls that can be aimed in the general direction of player system 104a or 104b, and where player systems 104a and 104b include an infrared detector that receives control data and identification data from the infrared controller of referee system 106. In this exemplary embodiment, player systems 104a or 104b can then transmit the control data and identification data to tracking controller 102 using a wireless transceiver. Tracking controller 102 can then perform commands pursuant to the control data and identification, and format status update data for referee system 106, the affected player system 104, and other suitable systems.

Target system 108 can be implemented in hardware, software, or a suitable combination of hardware and software, and can be one or more software systems operating on a portable processing platform such as a on a battery powered, portable processing platform, such as a C/C++ programmable 16-bit microprocessor with associated systems (such as an infrared receiver, LCD display, LED display, speaker, memory, controller interface, wireless transceiver, and other suitable systems), or other suitable platforms. Target system 108 can further include one or more special effects ports, such that special effects modules (such as a sound module, smoke module, pyrotechnics module, light module, or other suitable modules) can be added based upon cost, availability, game strategy, or other factors. Target system 108 allows users to place the target in a location, which is then transmitted to tracking controller 102 via communications medium 112. Target system 108 can thus include a GPS system or other suitable location system.

Target system 108 further includes status functionality, such as to allow members of the same or an opposing team to change the status. In one exemplary embodiment, a team member associated with target system 108 can activate target system 108, such as by entering a code, using an activation device, or by other suitable procedures, and can place the target system 108 in a secured position. Opposing team members can then attempt to "destroy" target system 108, such as by activating a control (such as a pushbutton, by using an interface device, by entering a code, or by using other suitable controls) that causes target system 108 to start a countdown mode. If the countdown is completed without interruption, then the target system 108 can generate audio or video signal data (such as through special effects modules) or other suitable data to indicate that target system 108 has been destroyed. Likewise, target system 108 can communicate the status data to tracking controller 102. In one exemplary embodiment, if a team member of the team associated with target system 108 reaches target system 108 after it has been activated by the opposing team but before destruction, the team member can deactivate target system 108, such as by activating a status change control, entering a control code, using a physical interface device, or by other suitable procedures.

A similar procedure can be used to "repair" targets that have been destroyed, such as where the target repair process is initiated when a control is activated, and the target changes to active after a predetermined repair period has passed and if the opposing team does not regain the target. Players can have repair rankings, such that repair probability, the time required for repair, or other factors can be dependent on the ranking of the player initiating repair. A repair tool or port device can also be required to initiate the repair.

Delivered weapon system 110 can be implemented in hardware, software, or a suitable combination of hardware and software, and can be one or more software systems operating on a portable processing platform such as a on a battery powered, portable processing platform, such as a C/C++ programmable 16-bit microprocessor with associated systems (such as an infrared receiver, LCD display, LED display, speaker, memory, controller interface, wireless transceiver, and other suitable systems), or other suitable platforms. Delivered weapon system 110 allows a player system 104a or 104b to simulate delivery of a weapon. In one exemplary embodiment, delivered weapon system 110 can simulate a hand grenade, land mine, detonation charge, or other suitable weapon, and can include one or more special effects that simulate detonation, such as sound, light, smoke, or other suitable effects. In another exemplary embodiment, delivered weapon system 110 can be a virtual weapon, such virtual aircraft, virtual air-to-ground missiles, virtual surface-to-air missiles, virtual air defense systems, virtual free fall bombs, virtual artillery, virtual chemical weapons, virtual nuclear weapons, virtual countermeasures, or other suitable virtual weapons. Such virtual weapons can have no physical embodiment and can be simulated in effect entirely, simulated in effect in conjunction with installed special effects generators (such as by using installed light or sound devices that are determined to be closest to the virtual location of the weapon), simulated in effect in conjunction with displays generated by player systems 104 (such as by notifying a player that they have been "hit" by the virtual weapon), or simulated in effect in other suitable manners.

Delivered weapon system 110 can activated by a player system 104a or 104b in a suitable manner, such as by activating a timer on a physical device or entering a software command for a virtual weapon. Upon detonation, a zone surrounding delivered weapon system 110 can be determined and players in that zone can be eliminated. In one exemplary embodiment, the zone can be based upon the coordinates of the weapon and the range of weapon, with appropriate compensation factored in for the probability of a player being injured as distance to the point of detonation decreases. In another exemplary embodiment, an RF frequency transmitter having limited range can be used, such that any player systems 104 that receive the transmitted signal are deactivated. Other suitable procedures can also be used. Delivered weapon system 110 can thus communicate with tracking controller 102 or player systems 104 to indicate that the delivered weapon has detonated.

In addition, delivered weapon system 110 can be acquired from either of player system 104a or 104b. In this manner, player system 104a can initiate play of the game, carrying one or more actual or virtual delivered weapon systems 110, and can then transfer the delivered weapon systems 110 to player system 104b. In one exemplary embodiment, player system 104b must be physically in proximity to player system 104a before transfer of the delivered weapon system 110 can be completed, such as by using coordinate data, using a physical interface device, or other suitable procedures. The transfer can also be voluntary, such as between members of the same team, or involuntary, such as from a member of an opposing team after they have been deactivated or captured.

In operation, system 100 allows player tracking to be incorporated into the functionality of the game, such as to allow players to make strategic decisions based upon tracking, to allow player activities to be added based on player tracking, to improve reliability of the game, and for other suitable purposes. System 100 allows player locations to be tracked to facilitate taking players out of or placing players in to play, such as by allowing players to be activated by a referee, to be taken out of play by a referee if they have been eliminated, or other suitable functions to be performed. System 100 allows targets to be used that can be moved, activated, deactivated and for other suitable functions to be performed. Likewise, system 100 allows delivered weapons to be simulated, such that players located within an area in which the delivered weapon is simulated to have effect, can be eliminated based upon their proximity to the simulated delivered weapon. Elements of system 100 can also be used where player coordinate tracking is not performed.

Figure 2:
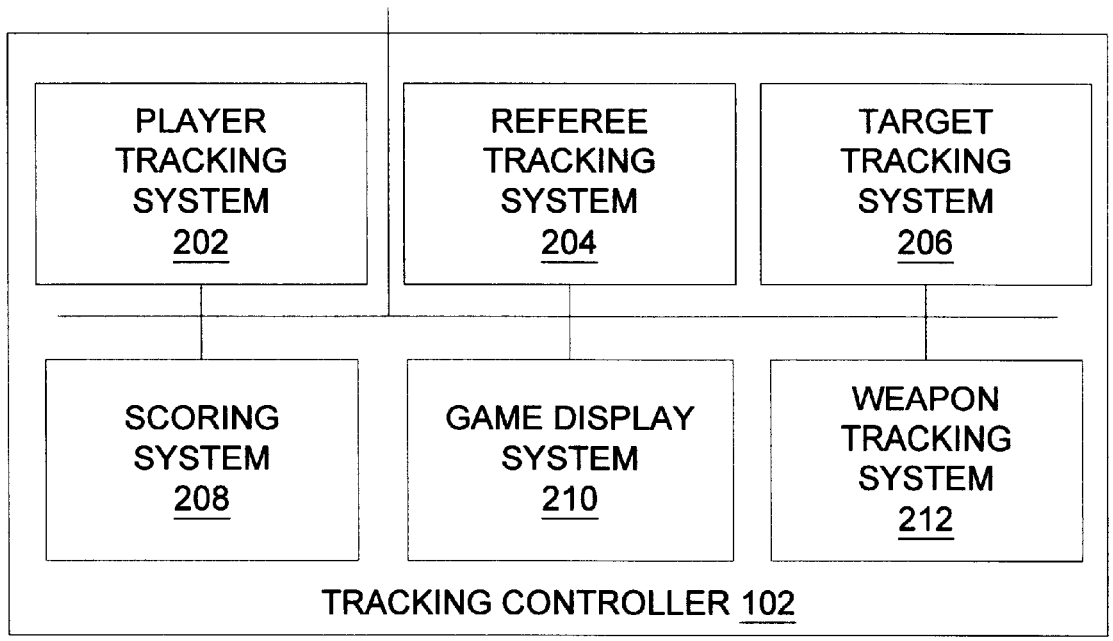
FIG. 2 is a diagram of a system for providing tracking functionality in accordance with an exemplary embodiment of the present invention.

FIG. 2 is a diagram of a system 200 for providing tracking functionality in accordance with an exemplary embodiment of the present invention. System 200 includes tracking controller 102 and player tracking system 202, referee tracking system 204, target tracking system 206, scoring system 208, game display system 210, and weapon tracking system 212, each of which can be implemented in hardware, software, or a suitable combination of hardware and software, in which can be one or more software systems operating on a general purpose processing platform.

Player tracking system 202 allows players to be tracked for identification, game functions, and other suitable purposes. In one exemplary embodiment, player tracking system 202 receives player coordinate data, such as from a GPS positioning system carried by each player, triangular coordination systems implemented with local radio frequency triangulation systems, or other suitable player coordinate tracking. Player tracking system 202 can also track player status, such as whether the player is currently active, inactive, team data, player classification data (commander, minesweeper, medic, weapons expert), has been affected by a weapon, such as a chemical weapon or nuclear weapon, so that the player has a remaining life, the amount of time that a player has been inactive, such as where the player must wait to come back into the game a predetermined period of time, player scores, player inventory data, and other suitable data. Player tracking system 202 can interface with other systems of system 200 to facilitate functions based on player physical locations, player inventories, or other suitable data. In one exemplary embodiment, player tracking system 202 can be used to track the transfer of weapons, medical supplies, or other suitable materials between players and teams, such as by allowing players and teams to transfer materials when they are within proximity of each other, preventing such transfers in the event that the players are not within proximity, and other suitable functions.

Referee tracking system 204 receives and transmits data to a referee system 106 or player system 104 with referee functional capabilities. In one exemplary embodiment, referee tracking system 204 can interface with player tracking system 202 to generate data for a display or other user interface that provides a map showing the location and status of players. Likewise, referee tracking system 204 can be used to obtain information on a player, such as by receiving a request for information from a referee system 106 that includes player identification data, receiving a request from a player system 104 that has received control command data from a referee system 106 (such as via an infrared signaling system), or in other suitable manners. Referee tracking system 204 thus allows a referee to determine the identification and status of a player, to take appropriate actions regarding the status of a player, such as to remove a player from play if that player has been tagged with a aintball or other suitable functions.

Target tracking system, 206 tracks the location of one or more targets, such as to determine where the target is located, the status of the target, team ownership of the target, and other suitable information. Target tracking system 206 thus allows a team or other person to move a target to a suitable location, and also to monitor targets after they have been activated to determine whether the same or opposing team members are protecting or in possession of the target, have deactivated the target, or other suitable functions. In one exemplary embodiment, target tracking system 206 can prevent the status of the a target from being inadvertently changed by members of the team that is in possession of the target.

Scoring system 208 receives scoring data for target activation, player deactivation, and other suitable information. In one exemplary embodiment, scoring system 208 can show the number of active players remaining, a score based on rankings of players of that have been deactivated or captured, scores based on the number of targets that have been destroyed, scores based on the number of weapons or supplies that have been destroyed or captured, or other suitable scores. Scoring system 208 can further track individual and team scores.

Game display system 210 receives player tracking data from player tracking system 202, referee tracking data from referee tracking system 204, target tracking data from target tracking system 206, scoring data from scoring system 208, weapon tracking data from weapon tracking system 212, and other suitable data, and generates a display that shows this data to a user. In one exemplary embodiment, game display system 210 can generate data for a map or other suitable display that shows player identification, referee location player status, player inventories, player and team scores, and other suitable data. Game display system 210 can also "replay" events, games, or other suitable data.

Weapon tracking system 212 tracks the number and type of weapons and weapon countermeasures that are under control of a team, team member, or other suitable parties. In one exemplary embodiment, weapon tracking system 212 allows each player to have control over one or more real or virtual weapons systems and countermeasures, such as hand grenades, mines, mine sweeps, chemical weapons, gas masks, medicine, air planes, gravity bombs, anti-aircraft missiles, missile delivery systems, anti-missile systems, nuclear weapons, or other suitable weapons and countermeasures. Weapon tracking system 212 tracks the location of the weapon systems (such as to allow them to be transferred between players or captured by hostile forces), the ownership of the weapon system (such as where ownership factors into the effect of the weapon), or other suitable data. In this manner, weapon ownership and use can be factored into team and individual scores, such as by determining the effectiveness of a player or teams use of weapons, the number of weapons that have been captured, or other suitable data.

In operation, system 200 allows player, target, weapon, and other tracking data to be used as part of a game, such as paintball or other suitable games. System 200 allows player locations to be tracked so as to allow referees to take players out after visually observing a deactivation event, targets to be tracked so as to allow players to move and capture targets, weapons to be tracked so as to keep track of the weapon ownership and use, to allow simulated weapons to be used in the game, and other suitable functions. Elements of system 200 can also be used where player coordinate tracking is not performed.

Figure 3:
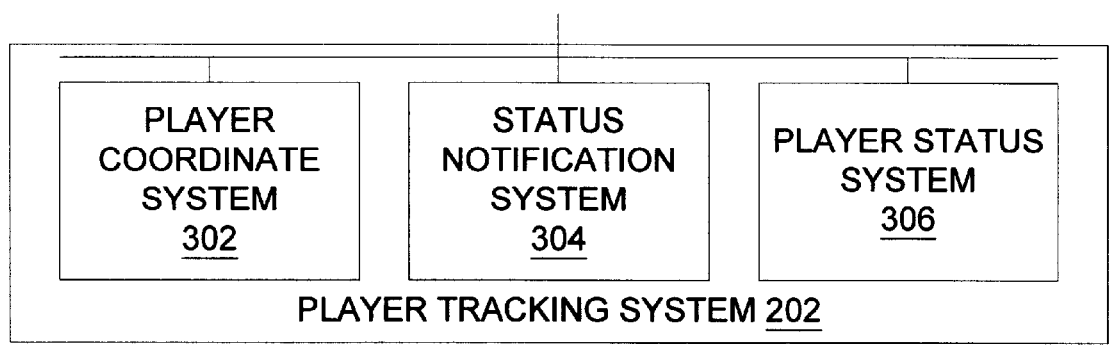
FIG. 3 is a diagram of a system for providing player tracking functionality in accordance with an exemplary embodiment of the present invention.

FIG. 3 is a diagram of a system 300 for providing player tracking functionality in accordance with an exemplary embodiment of the present invention. System 300 includes player tracking system 202 and player coordinate system 302, status notification system 304, player status system 306, and other suitable systems.

Player coordinate system 302 tracks the current (x,y,z) coordinates for players. In one exemplary embodiment, player coordinate system 302 can receive periodic GPS data or other coordinate data that is relayed from player systems 104 with player identification data, such as through the use of wireless media. Historical data for each player is stored by player coordinate system 302, thus allowing player, locations to be mapped and tracked.

Status notification system 304 provides player status data and control commands to player systems 104, referee systems 106, or other suitable systems. In one exemplary embodiment, status notification system 304 receives player status data from player status system 306, such as changes in status when a player is eliminated, when the elimination period has expired, intermediate player status changes, such as if the player has been exposed to a chemical or radiation weapon and has a finite period of time left to operate, changes in player medical conditions, such as if a player receives medicine from a player having medicine and thus is restored to full strength, changes in player inventory data, or other suitable notification. Status notification system 304 then determines the appropriate systems requiring status updates, and transmits the data to those systems, such as by using a wireless media. Status notification system 304 can thus transmit change of status data to a player system 104, referee system 105, or other suitable systems.

Player status system 306 stores player status data and generates status change data for use by status notification system 304. In one exemplary embodiment, player status system 306 can start the player in active mode with predetermined inventory and abilities. If the player is eliminated, such as by manual elimination after being struck, by a referee, through a virtual weapon, or by other suitable procedures, then player status system 306 can start a timer running, change the status of the player from active to inactive, and generate status change data. Player status system 306 can also change the player status after the inactive period has ended, can track remaining activity periods after a player has been injured or exposed to chemical or nuclear weapons, can track inventory such as by decreasing the number of virtual weapons or medicine doses held by the player after one is used, and can perform other suitable functions.

In operation, system 300 allows player tracking functions to be performed, so as to maintain coordinate data for locating the position of a player. System 300 also generates suitable notification data for related systems when a change in a player's status occurs, such as location, activity, inventory, or other suitable status indicators. System 300 thus allows a player's location and condition to be determined and used by other systems. Elements of system 300 can also be used where player coordinate tracking is not performed.

Figure 4:
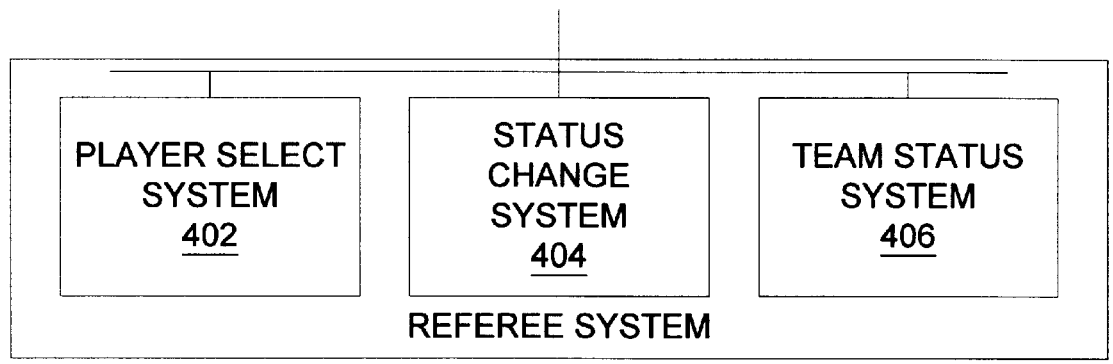
FIG. 4 is a diagram of a system for providing referee functionality in accordance with an exemplary embodiment of the present invention.

FIG. 4 is a diagram of a system 400 for providing referee functionality in accordance with an exemplary embodiment of the present invention. System 400 includes referee system 106 and player select system 402, status change system 404, and team status system 406, each of which can be implemented in hardware, software, or a suitable combination of hardware and software, and which can be one or more software systems operating on a general purpose server platform. System 400 functionality can also be provided, where suitable, to team commanders or players.

Player select system 402 allows a referee to select a player system 104 to receive player status data, changing the status data of the player, or for other suitable purposes. In one exemplary embodiment, player select system 402 can include an infrared controller that generates command data and referee identification data. The referee can activate player select system 402 by pressing a button and pointing an infrared transmitter at a player system 104. Other signaling can also or alternatively be used, such as laser, radio frequency, or other suitable systems. Player select system 402 can further provide data identifying the referee and control data to the player system 104, which can then be transmitted from the player system 104 with player identification data to a tracking controller 102.

Status change system 404 allows a referee to change the status of a player, such as from active to inactive, from inactive to active, to adjust inventory levels, to change rank or qualification data, score data, or other suitable status changes. In one exemplary embodiment, status change system 404 can receive player status data from a tracking controller 102 or other suitable systems in response to data provided by player select system 402. Status change system 404 allows a referee or other authorized user to make changes in the player status data, such as to change the status data of the player from active to inactive or from inactive to active, adjust inventory levels, change rank or qualification data, increase or decrease a player's score, and perform other suitable functions.

Team status system 406 allows a user to determine the status of a team, such as by viewing all active players, the number of players that have been deactivated, the locations of players, players having selected qualifications, or other suitable functions. Team status system 406 thus allows a referee, commander, or other suitable personnel to determine the status of a team, the amount of supplies held, the active members, capabilities of the active members, team score data, or other suitable data. In one exemplary embodiment, if predetermined actions can only be taken by a commander, and the initial commander is deactivated, then a referee or the deactivated commander can identify one of the remaining players as the new commander.

In operation, system 400 allows a referee, team commander, or other suitable personnel to view statistics and data describing the location and status of the team members, either individually or as a group. System 400 further allows modification of the status data, such as to allow transfer of leadership if a commander is taken out of play, to change a player from active to inactive status, or for other suitable purposes. System 400 can be used where player coordinates are tracked, and elements of system 400 can also be used where player coordinate tracking is not performed.

FIG. 5 is a diagram of a system 500 for providing weapons tracking functionality in accordance with an exemplary embodiment of the present invention. System 500 includes weapon tracking system 212 and bomb system 502, mine system 504, chemical weapon system 506, and hand grenade system 508, each of which can be implemented in hardware, software, or a suitable combination of hardware and software, and which can be one or more software systems operating on a general purpose server platform.

Bomb system 502 allows the destructive action of a bomb be simulated. In one exemplary embodiment, bomb system 502 can receive bomb identification data, such as type and amount of explosive material, delivery system, timer, and other suitable data, and can simulate the action of an explosive on players. In this exemplary embodiment, bomb system 502 can allow a player to select a target coordinate, delivery system, timer setting, or other suitable data. Bomb system 502 determines the probability of proper device explosion, such as based on actual device misoperation or delivery system misoperation rates, the operating player's experience level with the type of device, or other factors, and can then generate system coordinates that define the bounds of affect on players.

In one exemplary embodiment, a bomb system can include modeling for shrapnel type bombs, fire bombs, gravity bombs, artillery, mortar, bomb countermeasures (such as bomb detection systems, anti-missile systems, or other suitable countermeasures, which can be deployed in predetermined areas for predetermined or variable times and with predetermined or variable probabilities of success so as to have a probabilistic effect of counteracting a bomb) or other suitable materials such that the probability of a player being affected by the bomb can be determined through an appropriate probabilistic relationship with the type of bomb and player proximity to the point of detonation of the bomb. Likewise, bomb system 502 can associate bombs or countermeasures with a team member, can allow possession of bombs to be represented by physical devices or simulated by allowing players to transfer control by using a password, interface device, or other suitable features. In one exemplary embodiment, team control of a target system 108 representing control of related installations (such as air fields, missile silos, artillery, or other suitable installations) can be required or other suitable procedures for determining control of such installations can be used before activation of related virtual weaponry or countermeasures is confirmed.

Bomb system 502 can also include audio and visual effects such as noise, smoke, light, or other suitable affects that indicate that a bomb has been detonated. Bomb system 502 also performs team and player tracking functions, such as scoring/experience tracking, voluntary or involuntary transfer, and other tracking functions. In one exemplary embodiment, involuntary transfer of bombs or bomb countermeasures can also require that the opposing team capture a missile silo, air field, artillery, or other related equipment, where such equipment is represented by control of a target system 108.

Mine system 504 allows players to set mines for detonation by other players. In one exemplary embodiment, mine system 504 can be a physical device that generates a proximity radius signal, or which uses player coordinates to determine a probability of injury or other suitable player effects. Mine system 504 can also include audio and visual effects such as noise, smoke, light, or other suitable affects that indicate that a mine has been detonated. In another exemplary embodiment, mine system 504 can include mine countermeasures such as mine detectors that deactivate mines within a certain area, show the location of mines, cause mines to explode, or other suitable mine detection functions. Mine system 504 also performs team and player tracking functions, such as scoring/experience tracking, voluntary or involuntary transfer, and other tracking functions.

Chemical weapons system 506 allows the effect of chemical weapons to be simulated. In one exemplary embodiment, chemical weapons system 506 can include chemical type designators, delivery systems, timers, chemical weapons countermeasures (such as gas masks, medicine, or other suitable chemical weapons countermeasures), or other suitable chemical weapon characteristics, and can further receive information on current meteorological conditions, such as wind speed, precipitation, or other suitable meteorological conditions. Chemical weapons system 506 can also simulate actual device failure or misoperation characteristics. Chemical weapons system 506 can simulate detonation, such as using audio and video and visual data, such as smoke, light, sound, or other suitable characteristics. Chemical weapons system 506 generates probabilistic data regarding player health effects, such as death, injury, or other suitable health effects. Chemical weapons system 506 also performs team and player tracking functions, such as scoring/experience tracking, voluntary or involuntary transfer, and other tracking functions.

Hand grenade system 508 simulates the action of hand grenades by using physical devices, such as radio emitter devices or other suitable devices. Likewise, hand grenade system 508 can include audio and visual indicators such as light, sound, smoke, or other suitable indicators. Hand grenade system 508 can thus simulate injury and effects to personnel within a predetermined area, based on probabilistic effects, or other suitable effects. Hand grenade system 508 also performs team and player tracking functions, such as scoring/experience tracking, voluntary or involuntary transfer, and other tracking functions.

In operation, system 500 allows weapons to be simulated and tracked for use in a suitable game environment, such as a paintball arena. System 500 thus allows game functions to be expanded to include the use of simulated weapons, so as to better simulate actual wartime activities, provide additional features for games, or otherwise be implemented in conjunction with games. System 500 can be used where player coordinates are tracked, and elements of system 500 can also be used where player coordinate tracking is not performed.

FIG. 6 is a diagram of a system 600 for modeling weapon delivery in accordance with an exemplary embodiment of the present invention. System 600 includes delivered weapon system 110 and coordinate system 602, audiovisual display system 604, and capture system 606, each of which can be implemented in hardware, software, or a suitable combination of hardware and software, and which can be one or more software systems operating on a general purpose processor platform.

Coordinate system 602 determines the coordinates of a delivered weapon, such as a real or virtual delivered weapon, so that the effects of the weapon can be determined based on the coordinates, and also to allow weapons to be transferred between players. In one exemplary embodiment, a delivered weapon can include a physical device that generates GPS coordinates or other suitable coordinates. Likewise, delivered weapons can be virtual weapons where control of the virtual weapon is associated with a certain player, such that the player has access to a password code or other similar information that is used to activate the weapon. Coordinate system 602 thus tracks the location of physical delivered weapons, the coordinates of players having weapons and associated passwords, inventory information, and other suitable information. Coordinate system 602 allows friendly players to transfer weapons between themselves, such as by entering a suitable command in an interface device of a player system 104, using a key or other interface device, or in other suitable manners. Coordinate system 602 also allows weapons to be captured, such as by automatically transferring weapons from a captured player to one or more opposing team players, to the captain of the opposing team, upon receipt of a request at a tracking controller 102 from one of the capturing players, or in other suitable manners. In this regard, a player can be considered captured when the player's coordinates show that two or more members of the opposing team are within a predetermined distance to the player, if the player's status has recently changed from active to inactive, upon activation of "capture" control on a player system 104 by a member of the opposing team, or in other suitable manners.

Audiovisual display system 604 allows a delivered weapon to generate audio and visual indications of activation and detonation. In one exemplary embodiment, audiovisual display system 604 can include digital files that create explosion sounds when played, strobe lights, smoke generators, pyrotechnic devices, or other suitable audio visual display devices. In another exemplary embodiment, audiovisual display system 604 can be implemented as individual devices that are coupled to system 600 through special effects ports, so as to allow the audiovisual effects associated with a delivered weapon to be upgraded and modular. In yet another exemplary embodiment, audiovisual display system 604 can include distributed lights, speakers, pyrotechnic devices, and other suitable components that allow missiles, bombs, artillery, and other weapons to be simulated.

Capture system 606 allows opposing players to capture a delivered weapon from a player carrying the weapon. In one exemplary embodiment, if the player is captured by opposing members, the transfer of weapons can be automatic. In another exemplary embodiment, the transfer of weapons can occur if the player is surrounded by two or more other players of the opposing team, such that the player is between the coordinates of the other members. Other suitable configurations can be used to affect capture and transfer of weapons. In another exemplary embodiment, capture system 606 can also be used to transfer weapons between team members. Capture system 606 receives player coordinate data, weapon skills data, inventory data, team membership data, capture signal data, and other suitable data, and determines whether a player has been captured, whether the capturing team members have detected the delivered weapons, whether the capturing team members know how to use the captured weapon, and other data, where transfer of the captured weapons can be a function of one or more types of data.

In operation, system 600 allows delivered weapons to be simulated in a suitable environment, such as a paintball arena. System 600 allows weapons to be tracked, either virtually or using tracking devices, allows the weapons to generate audiovisual displays upon detonation, and allows weapons to be captured and transferred between hostile and friendly players. System 600 can be used where player coordinates are tracked, and elements of system 600 can also be used where player coordinate tracking is not performed.

FIG. 7 is a diagram of a system 700 for allowing a player to utilize a player tracking system in a game in accordance with an exemplary embodiment of the present invention. System 700 includes player system 104 and coordinate system 702, medic system 704, status system 706, and weapon activation system 708, each of which can be implemented in hardware, software, or a suitable combination of hardware and software, and which can be one or more software systems operating on a suitable processing system.

Coordinate system 702 generates coordinate data for players. In one exemplary embodiment, coordinate system 702 can include a GPS positioning system, a system determining position from triangulated radio frequency data, or other suitable systems generating coordinate data that allows the location of the player to be tracked. Coordinate system 702 can also receive coordinates for players on the player's team, such as to generate a display showing the location of other team members, the distance and direction to other team members, or other suitable coordinate data.

Medic system 704 allows a player to provide medical aid so as to change the status of a player from inactive to active, to counteract the effects of chemical weapons, or for other suitable purposes. In one exemplary embodiment, medic system 704 can include an inventory of medical "charges," where each charge is used to perform one status change. Medic system 704 can include a physical plug that requires players to insert the plug into a device in order to receive the charge. Likewise, medic system 704 can be transferred to other friendly players, can be captured through a capture system 606, and can be otherwise used in conjunction with system 100.

Status system 706 tracks status information for a player. In one exemplary embodiment, status system 706 can include a manual change system 706a, whereby a player can change their status manually to indicate that they have been shot. In another exemplary embodiment, status system 706 can include a referee change system 706b, such as an infrared device, whereby a referee system 106 can change the player status if the player fails to do so. If the referee changes the player status, the amount of time that the player is inactive can be increased, so as to create an incentive for players to fairly report their change of status. Status system 706 can also provide status indication, such as a status light 706c or timer display 706d, where a player has a certain amount of time of operation left after being exposed to nuclear or chemical weapons, where the player is inactive or captured, or other suitable status indication. In one exemplary embodiment, status system 706 can include a speaker or other suitable devices, and can generate a first indication when the player is active (such as green light), a second signal when the player has been deactivated (such as a red light and an audible countdown to reactivation), a third signal when the player is reactivated (such as a flashing green light and an audible signal), or other suitable audio and visual indications.

Weapon activation system 708 allows a player to track of and activate one or more delivered weapons (such as mines, hand grenades, and explosives) and corresponding countermeasures (such as mine detectors). Weapon activation system 708 further allows a player to keep track of and activate virtual weaponry (such as artillery, air strikes and missiles), countermeasures (such as antimissile defenses), and other suitable virtual weaponry. The player can enter a code, enter a timer period, use an activation device, or otherwise cause weapon activation system 708 to activate the weapon. Weapon activation system 708 can also apply probabilistic rules to render a weapon a dud, cause the weapon to misoperate (such as to explode early or late), can use a player skill level to determine the effectiveness of the weapon, and can perform other suitable weapon activation functions.

In operation, system 700 allows a player to participate in a game that utilizes a player tracking system, such as in a paintball arena, where the game controller uses tracking data generated by the player, other members of the player's team, other team members, targets, real and virtual weapons, and other features to provide player functionality. Elements of system 700 can also or alternatively be used in games where tracking functionality is not provided.

FIG. 8 is a diagram of a system 800 for providing target functionality in accordance with an exemplary embodiment of the present invention. System 800 includes target system 108 and target coordinate system 802, target status system 804, and target activation system 806, each of which can be implemented in hardware, software, or a suitable combination of hardware and software and which can be one or more software systems operating on a suitable processing platform.

Target coordinate system 802 generates coordinate data for the target. In one exemplary embodiment, target coordinate system 802 can generate coordinate data using a GPS system, by triangulation using local radio frequency sources, or other suitable target coordinate processes. Target coordinate system 802 can be used to track the location of targets, such as by a game controller, a team, by an opposite team after the target has been found and acquired, or in other suitable configurations.

Target status system 804 allows the status of a target to be displayed. Target status system 804 can include one or more special effects ports that allow special effects to be added as modules, such as hydraulics, audio, lights, smoke, and pyrotechnics. These special effects can be activated when the target is destroyed. Target status system 804 can also indicate its current status, such as a green light for when it is in the possession of its assigned team, a yellow light indicating a wait state after it an opposing team has reached the target, a red light after target destruction, and other suitable indicators.

Target activation system 806 allows the target to be activated so as to change the state of the target. In one exemplary embodiment, target activation system 806 can allow players to toggle the status, such as when the target is captured. In this exemplary embodiment, the opposing team can activate a timer such that after the expiration of the timer period the target will generate audiovisual indicator similar to those provided through audiovisual display system 604 of FIG. 6. Likewise, target activation system 806 can allow members of the same team to change the status back, such as to stop the countdown to the destruction of the target. Other suitable target status functions can be provided.

In operation, system 800 allows targets to be implemented in a game so as to provide objectives for opposing teams. System 800 allows targets to be moved where suitable, to be activated, to be deactivated, to indicate when the target is nearing destruction or has been destroyed, or other suitable configurations can be used. System 800 can also be used in a game where coordinate tracking is not provided, where suitable.

Figure 9:
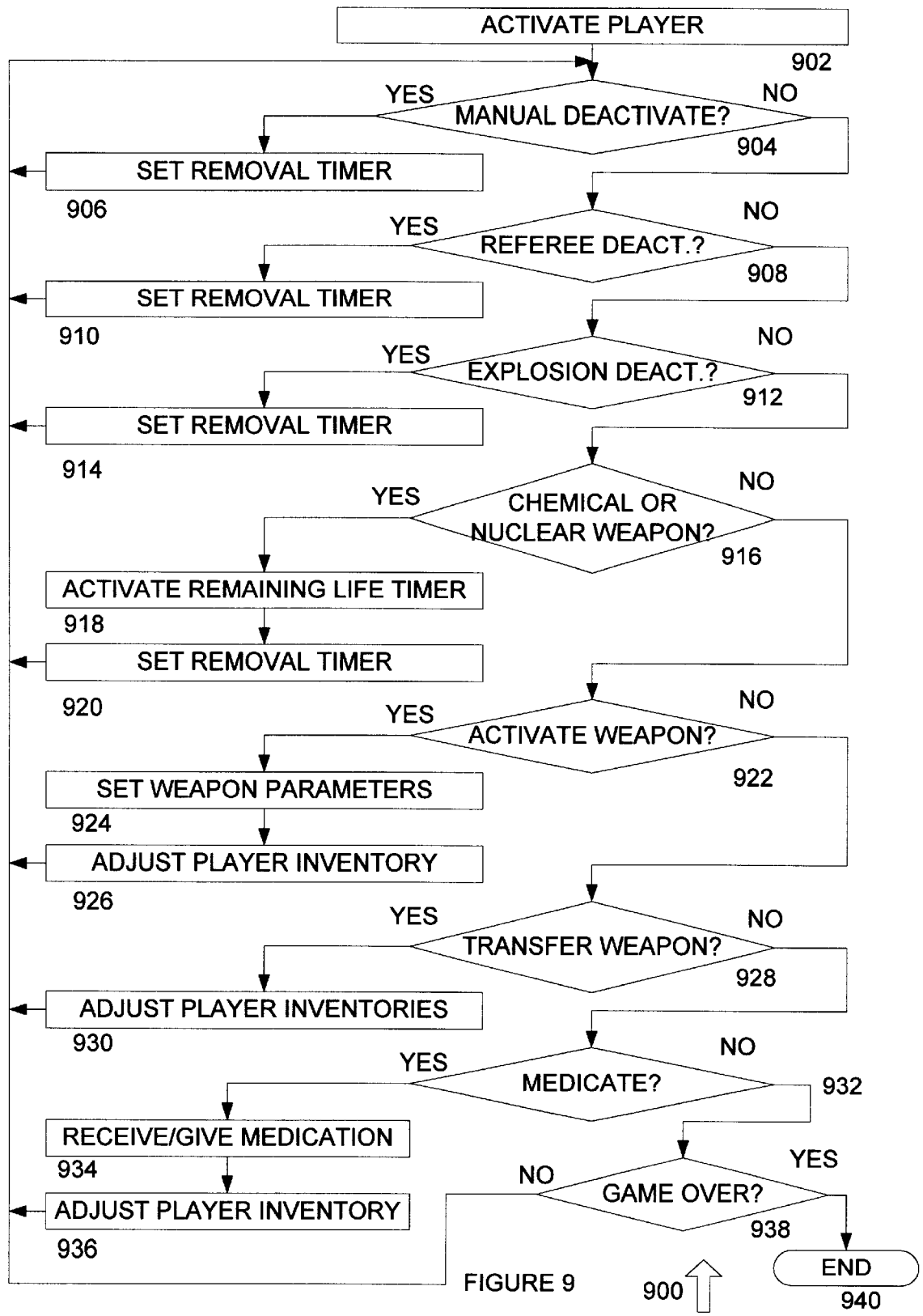
FIG. 9 is a flowchart of a method for providing player functionality in a game in accordance with an exemplary embodiment of the present invention.

FIG. 9 is a flowchart of a method 900 for providing player functionality in a game in accordance with an exemplary embodiment of the present invention. Method 900 allows players to perform actions that can be enhanced by knowledge of the coordinates of the player and the ability to control the status of the player based on the player's coordinates, but can also be implemented where player coordinate data is not determined.

Method 900 begins at 902 where a player is activated. In one exemplary embodiment, a player can be activated by identifying a team that the player is on, by providing the player with provisions such as delivered weapons, medical supplies, number of lives, and other suitable status, and other suitable data. Player data can also be stored over time, so as to allow a player to develop experience based on the number of games a player has participated in, the number of times the player has used delivered weapons or provided medical supplies to another player, the number of times that a player has successfully captured an opposing team's target, or other suitable experience metrics. After the player is activated, the method proceeds to 904.

At 904, it is determined whether a manual deactivation signal has been entered by the player. If a manual deactivation signal has not been provided, the method proceeds to 908. Otherwise, the method proceeds to 906 where a removal timer is set that defines an amount of time that the player must remain deactivated. In one exemplary embodiment, the removal timer can have a first predetermined period, such as one that is shorter than removal set by a referee or other persons, so as to create an incentive for players to accurately report deactivation manually. Likewise, a status indicator can be changed showing that the player has been removed from play. The method then returns to 904.

At 908, it is determined whether a referee deactivation signal has been received. If a referee deactivation signal has not been received, the method proceeds to 912. Otherwise, the method proceeds to 910 where a removal timer is set. As previously described, the removal timer can be set to a longer period for a referee deactivation, such as to create an incentive for players to accurately report their removal. Likewise, the referee can also reverse an inadvertent removal, such as when a referee determines that they mistakenly removed a player or set a removal timer. Player removal statistics can also be updated, such as to show whether a player is likely to wait until a referee removes them or to remove themselves. These statistics can also be used to determine scoring, experience, and other features. The method then returns to 904.

At 912, it is determined whether an explosion-related deactivation has occurred. If an explosion has not occurred, the method proceeds to 916. Otherwise, the method proceeds to 914 where a remaining life timer is set, such as where a player has been injured but is not deactivated. In this exemplary embodiment, medical attention can be provided to the player to allow them to return to play at full strength. If medical attention is not received, the player can be given decreased effectiveness at using delivered weapons or providing medical help, decreased experience points at the end of the game if the player is not captured, or other suitable effects of explosion injuries can be simulated. The method then returns to 904.

At 916, it is determined whether a chemical or a nuclear weapon attack has occurred. If a chemical or nuclear weapon attack has not occurred, the method proceeds to 922. Otherwise, the method proceeds to 918 where a remaining life timer is activated. In one exemplary embodiment, players in predetermined zones of chemical or nuclear weapon exposure can be statused as injured, such that the players have a predetermined amount of time remaining with which to perform certain actions after which they will be removed from play for a predetermined period of time. The method then proceeds to 920 where the removal timer is set to start after the remaining life timer stops. The method then returns to 904.

At 922, it is determined whether a player has activated a weapon. If the player has not activated a weapon the method proceeds to 928. Otherwise the method proceeds to 924 where the weapon parameters are set. In one exemplary embodiment, the weapon parameters can be set based upon the type of weapon in the player's or team's inventory, the player's experience level, the player's qualifications, the player's virtual state of health, player adjustable parameters such as timers, strike coordinates, or other suitable weapon parameters. The method then proceeds to 926 where a player inventory, team inventory, or other suitable quantities are adjusted, such as to decrease the amount of inventory by the number of weapons activated. The method then returns to 904.

At 928, it is determined whether a transfer of one or more weapons, medications, or other supplies is being requested. If it is determined at 928 that no transfer is being requested, the method proceeds to 932. Otherwise the method proceeds to 930 where player inventories are adjusted. In one exemplary embodiment, player inventories can be adjusted between players on the same team after entry of suitable transfer commands, the use of a transfer device, or other suitable procedures. Likewise, player inventories can be adjusted if a player is captured, such as if a player is within certain proximity of members of the opposite team, upon entry of commands by members of the opposite team, or other suitable functions. Transfer of virtual weapons such as missiles or gravity bombs can also be made contingent on capturing a related physical objective, such as a missile silo, air field, or other related objective that can be simulated by a target system 108 or in other suitable manners. The method then returns to 904.

At 932 it is determined whether a medical aid command has been received. If a medical aid command has not been received the method proceeds to 938. Otherwise the method proceeds to 934 where medication is exchanged between players. In one exemplary embodiment, players on the same team can provide medicine to injured players from their team, medical supplies can be captured by opposing team members, or other suitable transfers can be performed. The method then proceeds to 936 where player inventory is adjusted. The method then returns to 904.

At 938, it is determined whether the end of game has occurred. If the game is over, the method proceeds to 940 and completion processes are performed, such as notification to players that the game is over, generation of end of game displays for player review or participant review, or other suitable functions. If it is determined at 938 that the game is not completed, the method returns to 904.

In operation, method 900 allows players to participate in a game and use functions that are enabled through player coordinate tracking and other suitable functionality. Method 900 thus allows functions such as simulation of explosion events and accurate refereeing of deactivation to be performed so as to facilitate games, such as paintball arena games. Elements of method 900 can also be used in a game where coordinate tracking is not provided, where suitable.

Figure 10:
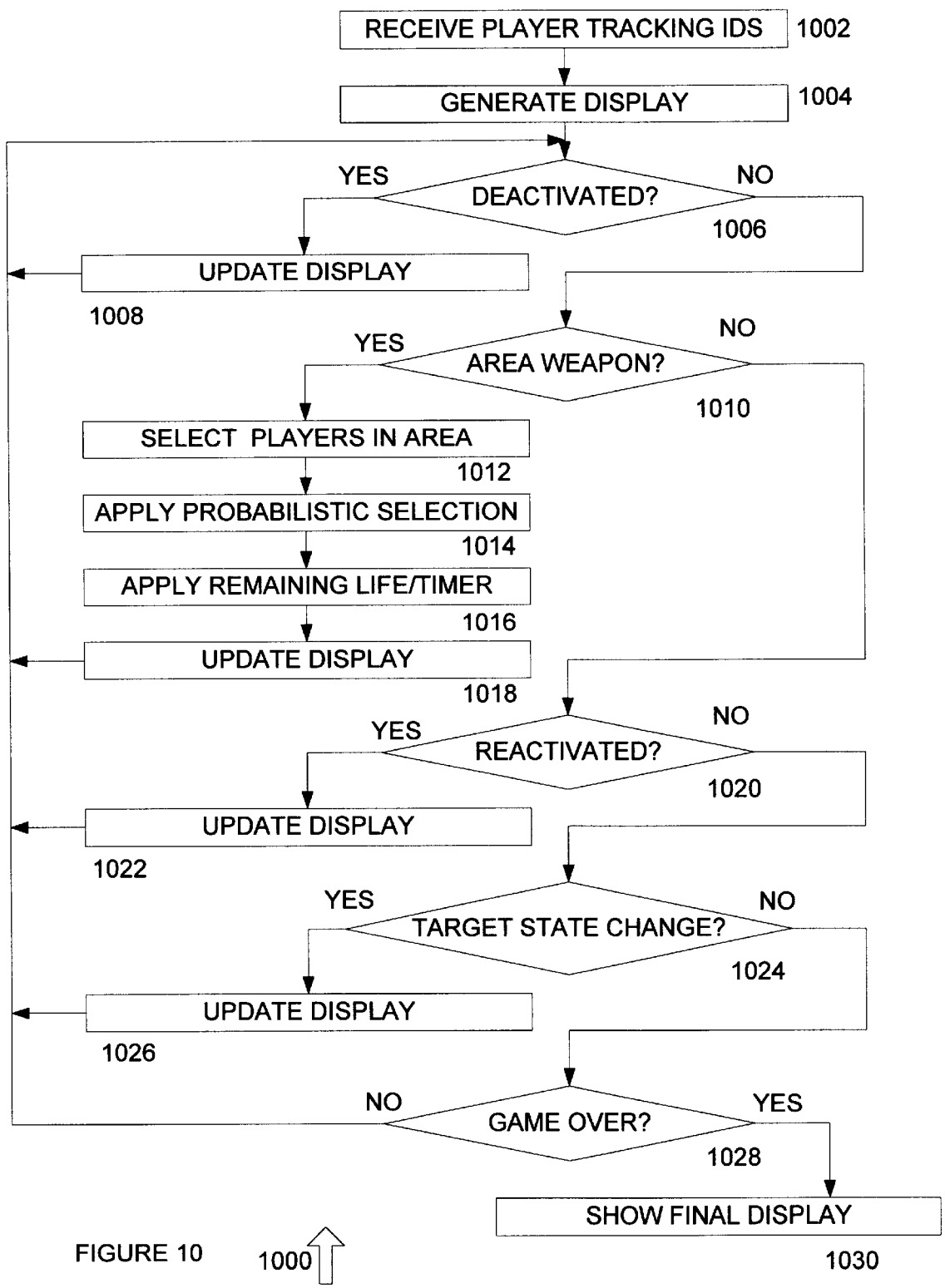
FIG. 10 is a flowchart of a method for controlling and tracking players in accordance with an exemplary embodiment of the present invention.

FIG. 10 is a flowchart of a method 1000 for controlling and tracking players in accordance with an exemplary embodiment of the present invention. Method 1000 allows game functionality to be provided through player tracking, such as for the performance of paintball games or other suitable games.

Method 1000 begins at 1002 where player tracking identification data is received. In one exemplary embodiment, player tracking identification data can be received at the beginning of the game, such as to identify teams, ranks of players, player functionality and inventories, and other suitable information. The method then proceeds to 1004.

At 1004, a display is generated. In one exemplary embodiment, the display can include indicators showing whether players are active or have been deactivated, inventories held by each player, ranks of players, locations of players, or other suitable displays. In another exemplary embodiment, the display is coordinated with a map of the playing field, so as to allow player movements to be tracked, the effects of weapons to be modeled, and other suitable functions to be performed. The method then proceeds to 1006.

At 1006, it is determined whether a player has been deactivated. If a player has not been deactivated, the method proceeds to 1001. Otherwise, the method proceeds to 1008 where a display is updated. In one exemplary embodiment, the display can be updated by showing a change in status of player (such as from green to red), by providing a timer showing the amount of time a player has left or remaining and being out of play, or other suitable information. The display can also be provided to referees, team captains, or other suitable personnel. The method then returns to 1006.

If it is determined at 1006 that a player has not been deactivated, the method proceeds to 1010 where it is determined whether an area weapon has been activated. Additional procedures can also be performed at 1010, such as confirming whether a target system 108 representing associated facilities that are required for use of the area weapon (such as missile silos or air fields) is under control of the team that is activating the area weapon. If an area weapon has not been activated, the method proceeds to 1020. Otherwise, the method proceeds to 1012 where players in the area in which the area weapon has been activated are selected. In one exemplary embodiment, the players can be selected through the use of a local radio frequency signal that if detected by the player's systems or devices will indicate that the player has been affected. Likewise, player coordinates can be used to select players within an area based upon coordinates of the weapon when it detonated. The method then proceeds to 1014.

At 1014, probabilistic selection is applied. In one exemplary embodiment, probabilistic selection can be applied to areas within the effect area of a weapon to determine whether the player escaped effect from the weapon, such as by missing shrapnel, by being shielded from the weapon by intervening obstacles, through misoperation of the weapon, or by other suitable probabilistic devices. After probabilistic selection is applied, the method then proceeds to 1016.

At 1016, remaining life or timeout conditions are applied to the players. In one exemplary embodiment, if it is determined that a player has been deactivated by a weapon, then the amount of time that the player must remain out of action is set on the player's timeout timer. Likewise, if it is determined the player is injured, or has been exposed to radiation or chemical weapons or other functionality, the remaining life for the player is set. The method then proceeds to 1018.

At 1018, the display is updated. In one exemplary embodiment, the display can include the display on a player system 104, the display on a tracking controller 102, the display on a referee system 106, or other suitable displays. The method then returns to 1006.

At 1020, it is determined whether a player has been revived to receive medication. If a player has not received medication or been revived, the method proceeds to 1024. Otherwise, the method proceeds to 1022 where the display is updated, such as the tracking controller 102 display, the player system 104 display, referee system 106 display, or other suitable displays. The method then returns to 1006.

At 1024, it is determined whether a target state change has occurred. If the target state change has not occurred, the method proceeds to 1028. Otherwise, the method proceeds to 1026 where the display is updated to indicate this current status of the target. In one exemplary embodiment, if a target is activated by members of opposing team, this can be indicated on the display. Likewise, if the opposing team recaptures a target, this can be updated or other suitable functions to be performed at 1026. The method then returns to 1006.

At 1028, it is determined whether the game is terminated, such as by the target changing to a final captured state without being recaptures by opposing teams, by the termination of all team members on one team or other suitable events. If it is determined at 1028 that the game is not over, the method returns to 1006. Otherwise, the method proceeds to 1030 where a final display is generated, such as a display showing scores, the number of remaining players alive, display replaying events of the game, or other suitable displays.

In operation, method 1000 allows player tracking to be used to provide additional functionality for suitable games, such as games played in the paintball arena or other suitable games. Method 1000 allows area weapons to be used, players to be revived or deactivated, target state change to occur, the transfer of supplies, and other suitable functions in games. Elements of method 1000 can also be used in a game where coordinate tracking is not provided, where suitable.

Figure 11:
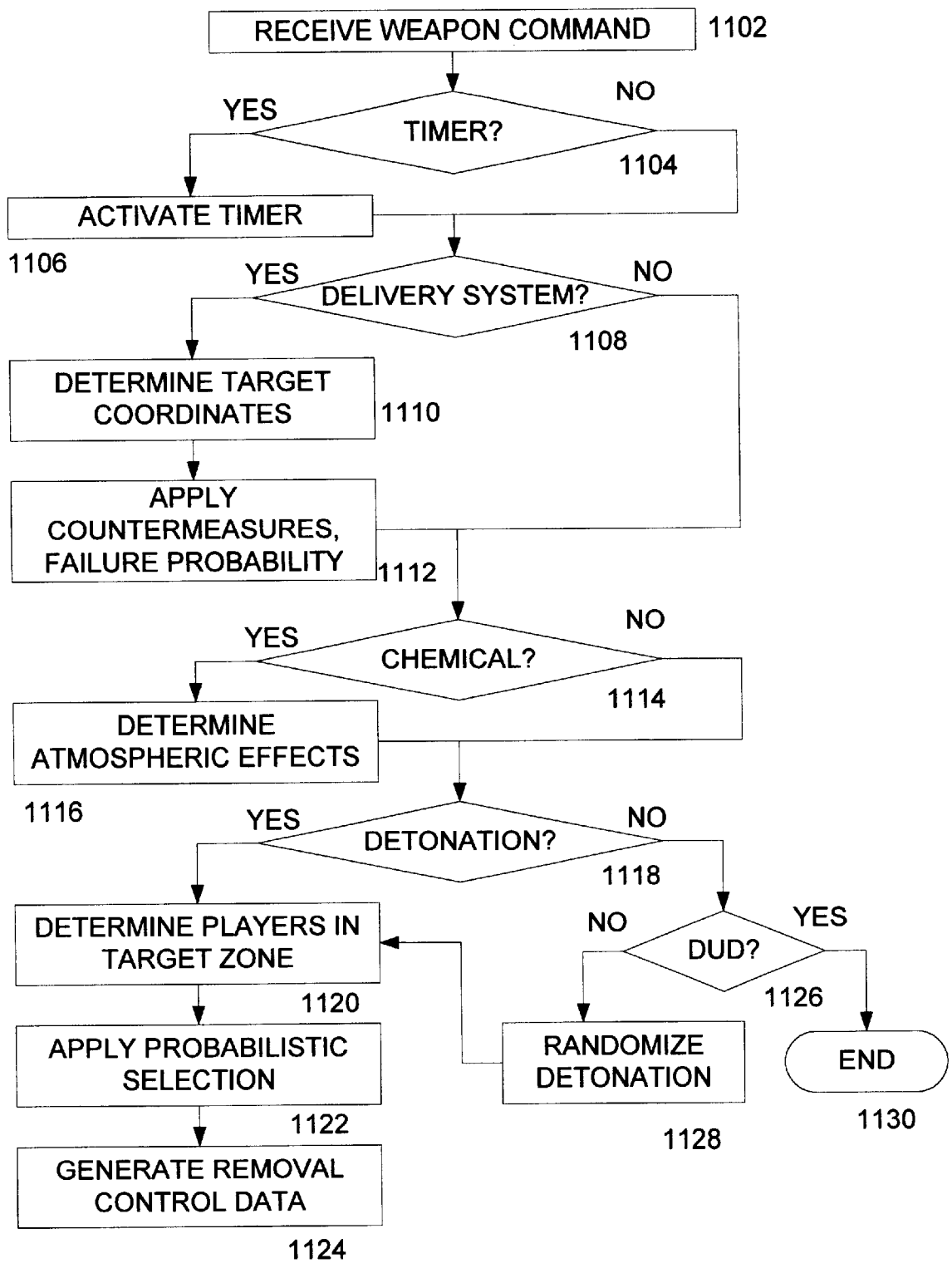
FIG. 11 is a flowchart of a method for providing area weapon functionality in accordance with an exemplary embodiment of the present invention.

FIG. 11 is a flowchart of a method 1100 for providing area weapon functionality in accordance with an exemplary embodiment of the present invention.

Method 1100 begins at 1102 where a weapon command is received. The weapon command can include weapon activation command, weapon parameter commands or settings, user qualification data, and other suitable weapon commands. The method then proceeds to 1104.

At 1104, it is determined whether a timer has been set. If a timer has not been set, the method proceeds to 1108. If a timer has been set, the method proceeds to 1106 where the timer is activated. In one exemplary embodiment, the timer can include a timer for a stationary area weapon, a timer for an area weapon that is going to be delivered by virtual delivery vehicles such as missiles or bombs, indicating the time at which impact is to occur, or other suitable timers. In this exemplary embodiment, if the timer indicates the time of delivery, this time can also be set to correspond with defensive measures, such as anti-missile defenses, where the anti-missile defenses are set to be active for a period of time, so as to counteract missiles, chemical weapons, mines, or other suitable weapons. The method proceeds to 1108.

At 1108, it is determined whether a delivery system selection has been made. In one exemplary embodiment, delivery systems can include gravity bombs, missiles, artillery, or other suitable delivery systems. Additional data can also be required to allow the use of predetermined delivery systems to be confirmed. In one exemplary embodiment, it can be determined whether a missile silo, airfield, or other related equipment is under the control of the team selecting the delivery system. Control of airfields, missile silos, or other related equipment can be determined by use of target systems 108 or other suitable systems. If a delivery system command has not been received or is not confirmed, the method proceeds to 1114. Otherwise, the method proceeds to 1110 where target coordinates are determined. In one exemplary embodiment, the target coordinates can include coordinates derived from a GPS system, from triangulated ground-based RF systems, or other suitable coordinate systems can be used. Likewise, target coordinates can be selected from a map or in other suitable manners. The method.the proceeds to 1112.

At 1112, countermeasures and failure probabilities are applied to the delivery system. In one exemplary embodiment, the delivery system failures rates for bombing missions, missiles, or other suitable delivery mechanisms can be used to simulate the probability of the failure of delivery systems, of misdelivery, such as bombing targets other than those identified, for misoperation by users with little or no training in the event the weapon has been acquired by such a user, or other suitable failures. Likewise, if the opponent has activated countermeasures, the effect of those countermeasures can be applied at 1112. The method proceeds to 1114.

At 1114, it is determined whether a chemical weapon, nuclear weapon, or other weapon having biological effects has been activated. If a chemical weapon has not been activated, the method proceeds to 1118. Otherwise, the method proceeds to 1116 whether atmospheric effects are determined. For example, atmospheric effects such as wind, rain, or other present atmospheric effects can be used to determine the area of effect of a chemical weapon or nuclear weapon. Atmospheric effects can be simulated or modeled, or other suitable atmospheric effects can be used. The method then proceeds to 1118.

At 1118, it is determined whether detonation has occurred. In one exemplary embodiment, detonation probabilities can be based on actual detonation probabilities for similar devices. If detonation has not occurred, the method proceeds to 1126 whether it is determined whether the device is a dud. If device is a dud, the method proceeds to 1130 and terminates. Otherwise, the method proceeds to 1128 whether detonation is randomized, such as randomizing the time of detonation, the location of detonation depending upon the delivery type, or other suitable randomized detonation parameters. The method then proceeds to 1120.

At 1120, it is determined whether the players in the target zone are determined, such as by showing the geographical scope of the area weapon and players within that scope, by determining plays through local RF signal reception, or other suitable player zone functionality. The method then proceeds to 1122.

At 1122, probabilistic selection is applied to the players within the target zone, so as to provide realistic simulation of survival rates for weapons based on proximity to blast, type of weapon, type of terrain, and other suitable functions. The method then proceeds to 1124.

At 1124, removal control data is generated. For example, removal control data can include timer settings for persons that are determined to have been deactivated by the blast, remaining life timers for simulated injuries, or other suitable data.

In operation, method 1100 allows area weapons to be simulated for use in a game where player coordinate data can be used to determine player locations and effects by areas weapons. Method 1100 allows suitable games, such as games played in the paintball arena, to take into account player location data, so as to enable functionality such as area weapons, or other suitable functionality. Elements of method 1100 can also be used in a game where coordinate tracking is not provided, where suitable.

Although exemplary embodiments of a system and method of the present invention been described in detail herein, those skilled in the art will also recognize that various substitutions and modifications can be made to the systems and methods without departing from the scope and spirit of the appended claims.

What is claimed is:

1. A system for tracking players comprising:
one or more player systems, each player system generating coordinate data and control data;
a tracking controller receiving the coordinate data and control data and performing one or more functions based on the control data;
a player tracking system receiving the coordinate data and the control data and generating display data; and
a scoring system receiving the control data and generating score data.

2. The system of claim 1 further comprising a target system generating target activation data, wherein the tracking controller receives the target activation data and generates display data.

3. The system of claim 1 further comprising a referee system transmitting control data to the tracking controller, wherein the tracking controller performs one or more functions based on the control data.

4. The system of claim 1 further comprising a delivered weapon system transmitting control data to the tracking controller, wherein the tracking controller performs one or more functions based on the control data.

5. The system of claim 4 wherein the delivered weapon system further comprises a capture system causing team ownership data to change from a first team to a second team.

6. The system of claim 4 wherein each player system further comprises a weapon activation system generating weapon activation data, wherein the delivered weapon system is activated based on the weapon activation data.

7. The system of claim 1 wherein each player system further comprises a medic system, the medic system generating activation status change data.

8. A game system comprising:
one or more player systems, each player system having associated status data; and
a referee system generating status change data that causes the status data of one or more player systems to change.

9. The system of claim 8 wherein each of the player systems further comprise a coordinate system generating coordinate data, and wherein the referee system can receive the coordinate data and generate a display using the coordinate data.

10. The system of claim 8 further comprising a target system generating target status data, wherein the referee system can receive the target data and generate a display using the target status data.

11. The system of claim 10 wherein the target system further comprises a coordinate system generating coordinate data, wherein the referee system can receive the coordinate data and generate a display using the coordinate data.

12. The system of claim 8 wherein each player system further comprises a status light system generating a status indicator that can be viewed by a user of the referee system for optical verification of the player system status.

13. The system of claim 8 wherein the referee system further comprises a player select system generating player select data for one of the player systems and receiving status data for the player system in response to the player select data.

14. A game system comprising:
a status change control generating first status data before a manual status change control is activated, second status data after the manual status change control is activated, and third status data after the second status data has been generated for a predetermined period of time; and
a status indicator coupled to the status change control, the status indicator generating a first indication when the first status data is generated by the status change control, a second indication when the second status is generated, and a third indication when the third status is generated.

15. The system of claim 14 wherein the status change control is a player status system, the first indication is an active player indication, the second indication is an inactive player indication, and the third indication is a reactivation indication.

16. The system of claim 14 wherein the status change control is a target activation system, the first indication is a target healthy indication, the second indication is an under attack indication, and the third indication is a target destroyed indication.

17. The game system of claim 14 further comprising:
a weapon system generating an RF signal; and
wherein the status change control receives the RE signal and changes the status data from the first status data to the second status data.

18. The game system of claim 14 further comprising:
a referee system generating an infrared signal; and
wherein the status change control receives the infrared signal and changes the status data from the first status data to the second status data.

19. The system of claim 8 wherein each player system further comprises one or more components that are worn by each player, and the referee system generates a signal that is received by the one or more components that causes the status data to change.

20. The system of claim 8 further comprising:
a target system generating target status data, the referee system receiving the target data and generating a display using the target status data, wherein the target system further comprises:
a coordinate system generating coordinate data, the referee system receiving the coordinate data and generating a display using the coordinate data;
each of the player systems further comprising:
a coordinate system generating coordinate data, the referee system receiving the coordinate data and generating a display using the coordinate data; and
a status light system generating a status indicator that can be viewed by a user of the referee system for optical verification of the player system status; and
the referee system further comprising a player select system generating player select data for one of the player systems and receiving status data for the player system in response to the player select data.

\* \* \* \* \*